United States Patent [19]
Norton, Jr.

[11] Patent Number: 4,622,599
[45] Date of Patent: Nov. 11, 1986

[54] WRITE DATA TRANSITION DETECTOR
[75] Inventor: David E. Norton, Jr., Boulder, Colo.
[73] Assignee: Storage Technology Corporation, Louisville, Colo.
[21] Appl. No.: 672,705
[22] Filed: Nov. 19, 1984
[51] Int. Cl.[4] .......................... G11B 27/36; G11B 5/09
[52] U.S. Cl. ........................................ 360/31; 360/46
[58] Field of Search ................. 360/31, 46, 110, 111, 360/112, 113, 114, 115; 324/212; 371/25

[56] References Cited
U.S. PATENT DOCUMENTS

| | | | |
|---|---|---|---|
| 2,530,562 | 11/1950 | Blaney | 179/100.2 |
| 2,782,262 | 2/1957 | Hammond, Jr. et al. | 179/100.1 |
| 2,789,026 | 4/1957 | Nordyke, Jr. | 346/74 |
| 2,919,968 | 1/1960 | Fernandez-Rivas et al. | 346/74 |
| 3,080,560 | 3/1963 | Klehm, Jr. et al. | 346/74 |
| 3,288,924 | 11/1966 | Baldwin | 178/6.6 |
| 3,315,268 | 4/1967 | Edde | 346/74 |
| 3,559,192 | 1/1971 | Schlossbauer | 340/174.1 |
| 3,588,375 | 6/1971 | Martin | 179/100.2 |
| 3,604,859 | 9/1971 | Ban | 179/100.2 |
| 3,617,652 | 11/1971 | Krausse | 179/199.2 |
| 3,668,310 | 6/1972 | Yano et al. | 178/6.6 |
| 4,203,137 | 5/1980 | Beck et al. | 360/31 |
| 4,212,702 | 7/1980 | Mizuguchi et al. | 162/36 |
| 4,268,905 | 5/1981 | Johann et al. | 364/200 |
| 4,535,371 | 8/1985 | Harr et al. | 360/46 |

Primary Examiner—Vincent P. Canney
Attorney, Agent, or Firm—Woodcock Washburn Kurtz Mackiewicz & Norris

[57] ABSTRACT

A write data transition detector is provided connected across a thin film write head and write current generator and is responsive to the fractional voltage drops across the head resulting from the fractional amperage currents passed by the write generator through the head. Circuits in the detector adjust the gain of the voltage difference across the head, remove voltage spikes induced by changes in current across the head and time the period between consecutive current reversals of sufficient magnitude. The timing is controlled by means of a hysteresis circuit which switches from an existing state to an alternate state only when there is a satisfactorily large reversal of current across the write head. A timing circuit connected with the hysteresis circuit capacitively times the length of the period the hysteresis circuit remains in its existing state and outputs a fault indication current when this period exceeds the maximum period between transitions allowed by the encoding scheme employed.

10 Claims, 6 Drawing Figures

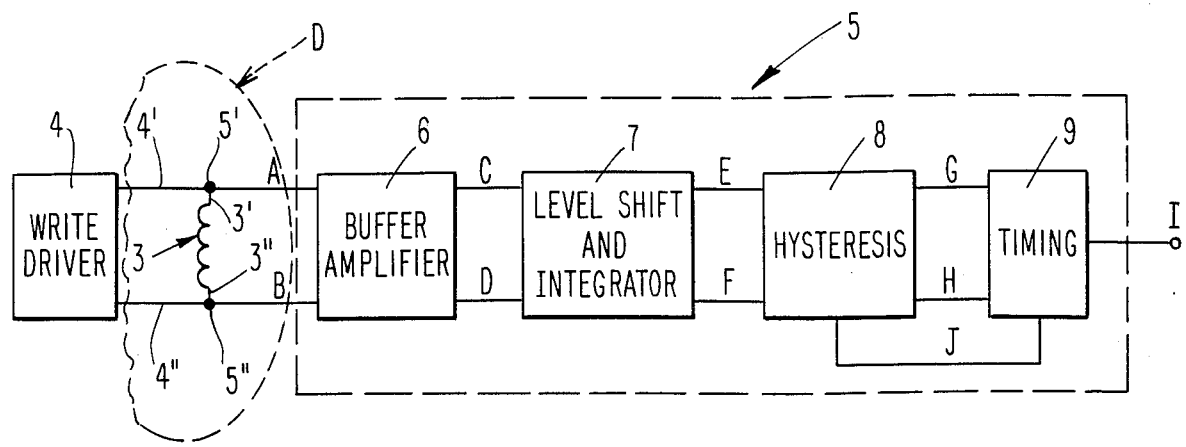
*Fig. 1*
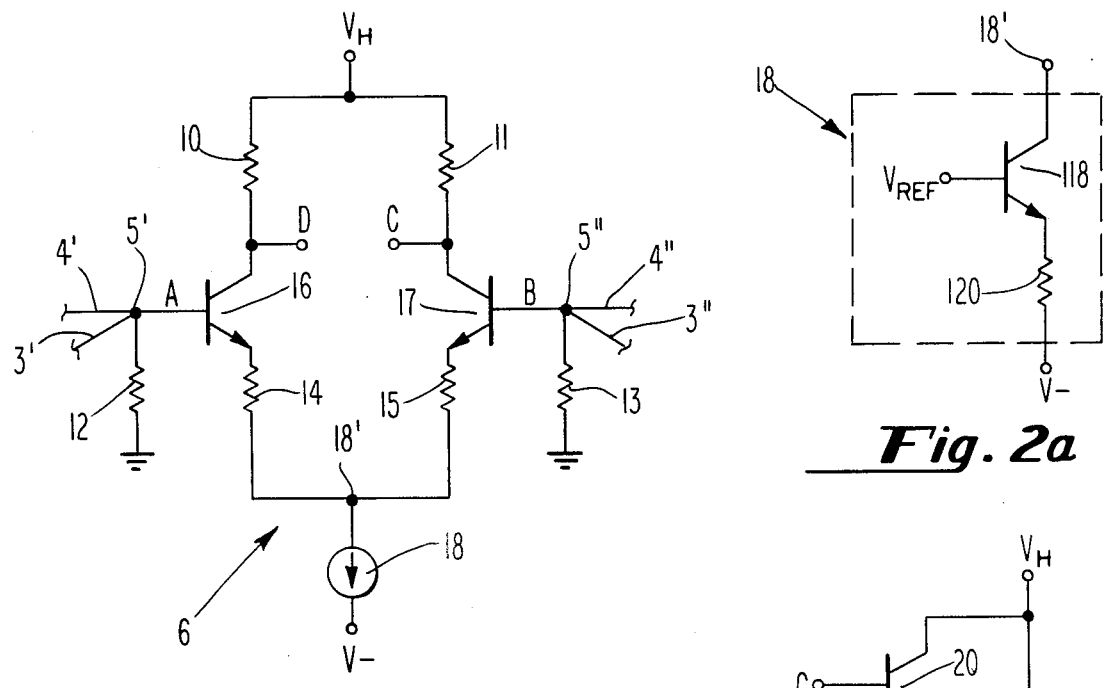
*Fig. 2*
*Fig. 2a*
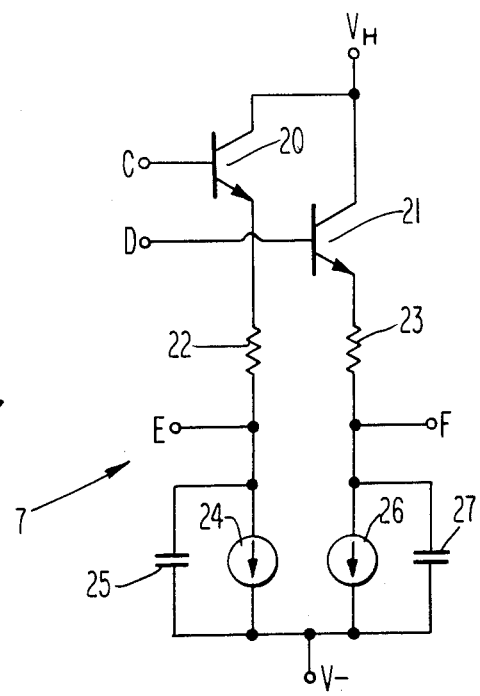
*Fig. 3*

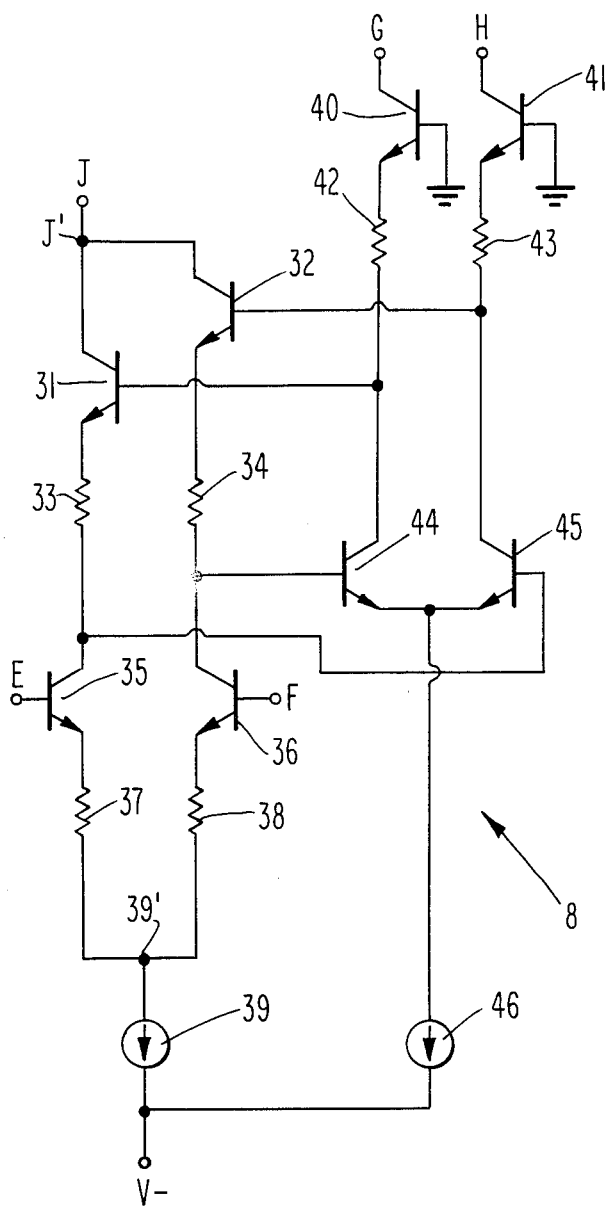
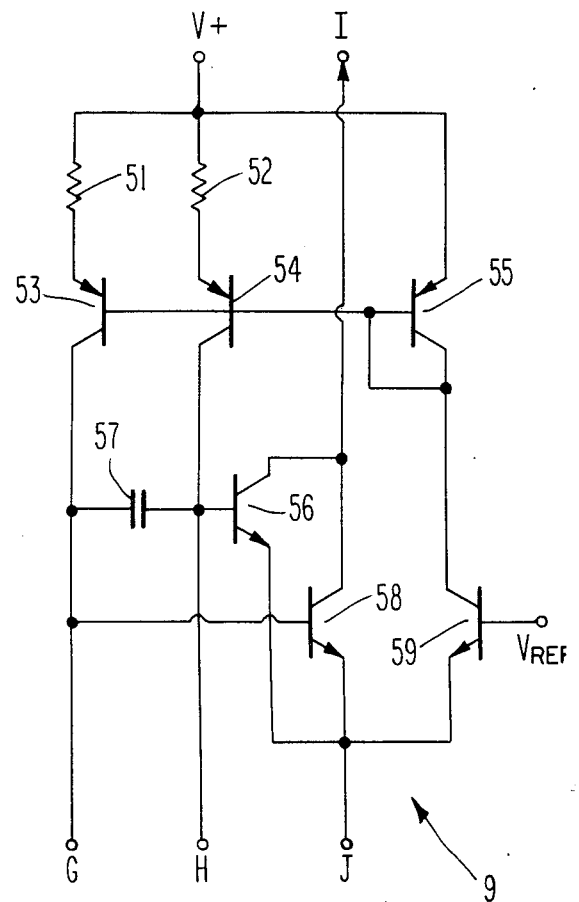
Fig. 4
Fig. 5

WRITE DATA TRANSITION DETECTOR

FIELD OF THE INVENTION

The invention relates to fault detectors for use in electromagnetic data storage systems and, in particular, to a write data fault detector for use with a write head in a magnetic disk data storage system.

BACKGROUND OF THE INVENTION

In magnetic data storage systems it is necessary to detect certain electrical fault conditions during data writing operations that will destroy data or cause it to be irretrievably lost. In magnetic disk data storage devices, data recording is accomplished by switching the direction of a current across the write head of the device. Three fault conditions which may affect such systems are: (1) lack of write data transitions, (2) shorting of the write head wire to the support, and (3) lack of write current. The first condition typically arises from hardware problems; conventionally used data encoding schemes require that a transition be provided within a preset period of time or the data is invalid. The second condition typically arises from a break in the insulation of the head wire. The third condition also typically arises from a hardware fault; if no write current is generated, then no data will be written even though all other indications are that valid data was written. Any of the three aforesaid fault conditions will prevent the proper recording of data and may result in its eventual loss.

Older data disk systems typically utilize ferrite write heads, while newer drives often incorporate thin film write heads. Thin film write heads differ from the older, ferrite write heads in that the former are mostly resistive elements with very little inductive component while the latter are almost entirely inductive. One sees alternating current spikes of several volts across the ferrite head when writing whereas one sees only millivolt level potential switching across the thin film head when writing.

Various methods have been employed in the past for detecting one or more of these fault conditions in various types of magnetic data storage write systems. For example, U.S. Pat. Nos. 3,080,560, 2,789,026, 2,919,968 and 3,315,268 all use a write head current or signal induced from a head current to check proper write operations. In particular, each uses a timing arrangement that checks the write current at each possible data write point (current transition point) for the occurrence of a transition in the write current (or the lack thereof). After each check, the circuit is reset to monitor for the next potential transition at the next potential transition point. Because many encoding schemes do not require a transition at each potential transition point, additional logic is typically provided to determine if more than an allowable number of potential transitions have been missed. While these disclosed circuits may detect one or even two of the aforesaid three faults, none is responsive to all three of the aforementioned faults. Also, these testing schemes and devices are not easily adapted to thin film head systems.

U.S. Pat. Nos. 3,559,192; 3,617,652; 3,668,310 and 4,212,702 utilize another well known technique of write fault detection: and immediate subsequent read operation to verify that the write operation has generated a proper magnetic record on the data storage media. Reading may reveal all three faults. However, the fault may be such that the quality of the written data is poor, but readable. This condition will typically worsen with time and it is preferable to check the data quality while it is being written.

SUMMARY OF THE INVENTION

It is an object of the invention to provide an apparatus for detecting and indicating any and all of three possible fault conditions in a thin film write head: lack of write data transitions, head wire shorting to the head support and lack of write current.

It is another object of the invention to provide write fault detection to accommodate voltage level differences of less than about one volt typically encountered with thin film write heads.

According to the invention, fault detection is accomplished by means of a hysteresis circuit connected across the thin film head which is responsive to voltage level differences of a fraction of a volt across the head and stabilizes in one of two alternate states depending upon the state of the voltage level difference across the head and a timing circuit responsive to the state of the hysteresis circuit for indicating when the hysteresis circuit has remained in one state for a sufficient length of time to be characterized as a fault. The provided hysteresis action prevents the detector from interpreting the loss of write current voltage arising from the grounding of the head wire or the change from a condition of current in one direction across the head to a condition of no current as being merely another transition. In particular, the hysteresis circuit of the invention requires a minimum voltage differential of appropriate polarity to be provided across the thin film head before "recognizing" a change of electrical state across the write head as a transition.

BRIEF DESCRIPTION OF THE DRAWINGS

The invention will be more easily understood with reference to the accompanying figures in which:

FIG. 1 depicts in block diagram form the write data fault detector of the present invention connected in parallel with a write driver circuit across a thin film write head;

FIG. 2 depicts the buffer amplifier of the fault detector;

FIG. 2a depicts the current sink circuit of the amplifier;

FIG. 3 depicts the level shift and integrator circuit of the fault detector;

FIG. 4 depicts the hysteresis circuit of the fault detector; and

FIG. 5 depicts the timing circuit of the fault detector.

DETAILED DESCRIPTION OF THE DRAWINGS

FIG. 1 depicts diagrammatically a disk drive thin film write head 3, a write current driver circuit 4 connected across the head 3 at node points 5' and 5" for generating small (i.e. fractional amp) write currents across the head 3 and the write fault detection circuit 5 of the subject invention also connected across the node points 5' and 5". These currents through the head induce changes in the magnetic state of a magnetic data storage disk D (represented by a broken line) positioned juxtaposed to the thin film head 3. The write driver 4 reverses the direction of current through the head 3 to record a transition on the disk D. All generally used encoding schemes require transitions be made at a regular rate or at least within a predetermined period of time from the last transition. The length of this period will vary with the encoding scheme employed. Basically, the detection circuit 5 monitors and "times" the interval between successive head current reversals and generates a fault current output if a sufficiently large reversal in current does not occur after the last occurring application of a current within the period of time required by the encoding scheme employed. The disclosed circuit 5 was built for use with a 2 of 7 encoding scheme requiring a transition each microsecond, but one skilled in the art can apply it to other encoding schemes, arrangements and periods.

The detection circuit 5 is connected in parallel with the write driver circuit 4 across the thin film head 3 in order to respond to the voltage differences generated across the head 3 at nodes 5' and 5" by the write driver 4 currents. The major components of the detection circuit 5 include a buffer amplifier 6 directly responsive to the voltage differences across the thin film head 3 generated by the write driver 4, a level shift and integrator circuit 7 responsive to voltage levels generated by the buffer amplifier 6 across lines C and D, a hysteresis circuit 8 responsive to adjusted voltage levels generated by the level shift and integrator circuit 7 across lines E and F and a timing circuit 9 responsive to currents passed on lines G, H and J. The timing circuit includes a fault indication current source node I for outputting a direct current to a fault indicator device such as a logic input of a disk drive controller (not depicted) when a fault condition has been detected by the circuit 5.

FIG. 2 depicts the circuit arrangement for the buffer amplifier 6 and the connections at node points 5' and 5". The buffer amplifier 6 acts as a linear differential amplifier and adjusts the voltage levels at the nodes (i.e. on lines) C and D in response to voltage level differences generated at 5' and 5". The amplifier 6 consists of a pair of npn transistors 16 and 17, each having a base connected with a different node point 5' and 5", respectively. Each node point 5' and 5" is formed by an output line 4' or 4", respectively, from the write driver circuit 4; a connection 3' or 3", respectively, to the write head 3; a line A or B, respectively, to the base of transistors 16 and 17, respectively; and a connection to ground through identical resistors 12 or 13, respectively. The collector of each transistor 16 and 17 is connected with a write head voltage node $V_H$ through identical resistors 10 and 11. In this embodiment, the voltage $V_H$ is ground. The emitter of each transistor 16 and 17 is connected through an identical resistor 14 or 15 to a summing node 18' and then through a current "sink" 18 to a negative source node $V_-$ which is maintained at a fixed predetermined negative level with respect to $V_H$. The current sink 18 is depicted separately in FIG. 2a and includes an npn transistor 118 having a base connected to a fixed reference voltage $V_{REF}$, a collector connected with the junction 18' and an emitter connected through a resistor 120 to a node of the voltage source $V_-$. The sink 18 "sinks" current out from the summing node 18' and delivers it to the $V_-$ supply. The circuit provides an amplification ratio of R10/R14. Resistors 14 and 15 are selected to make the output of the transistors 16 and 17 linear for the range of voltage levels expected to be generated by the write driver circuit 4. The node points of connections C and D between the buffer amplifier 6 and the level shift and integrator circuit 7 are indicated.

FIG. 3 depicts the components of the level shift and integrator circuit 7. The purpose of this circuit is to provide a shift downward in the voltage level differences presented to the hysteresis circuit 8 from those outputted by the buffer amplifiers and a capacitive smoothing action to remove a voltage spike, typically about 20-30 nanoseconds in duration, induced by the head and wire assembly during transition in the voltage differential across the head 3. The smoothing action thus provided prevents false response by the fault circuit 5 to a spike which occurs when the current changes direction through the head. Otherwise, a small write current (below the minimum allowed) could cause the circuit to "sense" a transition and trip. A pair of identical npn transistors 20 and 21 have bases which are connected with the node points C and D of the buffer amplifier 6 in FIG. 2. The collector of each transistor 20 and 21 is connected with a node of the write head voltage source $V_H$ (ground). The emitter of each transistor 20 and 21 is connected with a node of the negative voltage source $V_-$ through an identical resistor 22 or 23, an identical current sink 24 or 26 (identical to the sink 18 of FIGS. 2 and 2a), and an identical parasitic capacitor 25 or 27, respectively. (A parasitic capacitor is one formed with the construction of the transistors, a common substrate.) The node points of connections E and F between this circuit and the hysteresis circuit 8 are indicated. Resistors 22 and 23 further reduce voltage levels at node points E and F from those at C and D. Capacitors 25 and 27, associated with resistors 22 and 23, provide the integrating action to remove the inductive spike associated with the write voltage waveform across the head 3.

Turning now to FIG. 4, the components of the hysteresis circuit 8 are depicted. The hysteresis circuit 8 retains a "memory" of the previous write data transition across the head 3 by virtue of always being in one of two alternate states at the node points G and H. A voltage differential reversal of sufficient magnitude must be generated across the head 3 before the hysteresis circuit 8 will switch to its alternate state. This prevents a sudden loss of voltage or current across the head 3 from being interpreted as a data transition. Hysteresis circuit 8 includes identical pairs of npn transistors 31 and 32, 35 and 36, 40 and 41, and 44 and 45. The base of each of a first pair 35 and 36 of the transistors are connected to node points E and F from the level shift and integrator circuit 7 and are responsive to the voltage levels generated by that circuit 7 on those lines. Transistors 35 and 36 each have an emitter connected through a different resistor of a first pair of identical resistors 37 and 38 and through a common current junction 39' to a common current sink 39, also identical to the sink 18 of FIGS. 2 and 2a. Each one of a second pair of the transistors 44 and 45 has a base connected with a collector of a different one of the first pair of transistors 35 and 36, a collector connected with a different one of a second pair of identical resistors 42 and 43 and an emitter connected with a second common current sink 46. Each of a third pair of transistors 31 and 32 has a base connected between the collector of a different one of the second pair of transistors 44 and 45 and, through its connected resistor 42 and 43 respectively, to the emitter of a different one of the fourth pair of transistors 40 and 41. Each transistor 31 and 32 also has a collector connected through a common current junction J' with line J between the hysteresis circuit 8 and timing circuit 9. An emitter of each of the transistors 31 and 32 is connected with a collector of a different one of the first pair of transistors 35 and 36 through a different one of a third pair of identical resistors 33 and 34. The first common current sink 39 pulls a current through the first and third sets of transistors 35–36 and 31–32, respectively, and the first and third pairs of identical resistors 37–38 and 33–34, respectively. The second common current sink 46 pulls a separate current through the second pair of transistors 44 and 45, second pair of resistors 42 and 43 and fourth pair of identical transistors 40 and 41. The first and second current sinks 39 and 46 are connected in parallel to a node of the negative voltage source $V_-$. The fourth pair of identical transistors 40 and 41 each has a base connected to ground. This arrangement causes the transistor 40 or 41 connected with the greater conducting or "on" transistor 44 or 45 to saturate. For proper operation, the voltage drop across resistor 33 or 34 (i.e. $I_{39} \times R_{33,34}$) must be greater than the voltage drop across resistor 42 or 43 (i.e. $I_{46} \times R_{42,43}$).

First current sink 39 of this circuit powers a differential amplifier formed by transistors 35 and 36 and resistors 33, 34, 37 and 38 and providing a gain of $R_{33}/R_{37}$. The latter pair of resistors also are selected to render the transistors 35 and 36 linear over the expected range of voltage levels on lines E and F. Sink 39 further pulls current from the timing circuit 9 through line J and from the fault detection current node I of that circuit 9. Second sink 46 of this circuit pulls currents through nodes G and H to operate the capacitive timing component of the timing circuit 9. The state of the voltage differential across the write head 3 is indicated to the timing circuit by means of the transistors 40 and 41 which are controlled by transistors 35 and 36 through transistors 44 and 45. Since transistors 44 and 45 do not have resistors at their emitters, the transistor 44 or 45 having the higher (less negative) base voltage will be the greater conducting or "on" transistor and carry essentially all of the current to the sink 46. Resistors 42 and 43 provide the hysteresis action through transistors 31 and 32, preventing a switch in the states of 44 and 45 until the voltage difference between E and F times the gain (i.e. $V_E-V_F) \times R_{33}/R_{37}$) is greater than the voltage drop across the resistor 42 or 43 associated with the greater conducting transistor 44 or 45 (i.e. $I_{46} \times R_{43,43}$). To accomplish this, resistors 33–34 and 42–43 are selected so that the maximum voltage drop across the former (i.e. $I_{39} \times R_{33, 34}$) is greater than the maximum drop across the latter (i.e. $I_{46} \times R_{42,43}$). Transistors 31 and 32 further provide a "snap-action" effect by raising the voltage of the base of the more conductive transistor 44 or 45 inducing an even greater diversion of current and causing very rapid changes in conductive states of transistors 44 and 45 once that change has begun.

Turning now to FIG. 5, the components of the timing circuit 9 are depicted. This circuit 9 "times", by capacitive action, the period that the hysteresis circuit 8 has remained in its then current conductive state (i.e. one transistor 40 or 41 saturated and the other "off") and outputs a current at node I for fault indication when this period exceeds the maximum allowable time between transitions for the data encoding scheme and hardware being employed. Three identical pnp transistors 53–55 and three identical npn transistors 56, 58 and 59 are provided together with a pair of identical resistors 51 and 52 and a timing capacitor 57. The base of transistor 59 is connected to a node of the reference voltage $V_{REF}$. A node of a positive power voltage source (i.e. above ground) $V_+$ is also provided. The emitters of the three transistors 53, 54 and 55 are connected in parallel with power voltage source node $V_+$, the former two being connected in series through identical resistors 51 and 52. The base of each of these same three transistors 53, 54 and 55 is also connected in parallel with the collector of npn transistor 55, as is the collector of transistor 59. The emitter of each of the three transistors 56, 58 and 59 is connected in parallel with line J between the timing and hysteresis circuits and carry current to the current sink 39. The collectors of transistors 56 and 58 are connected in parallel with the fault indication current node I while the base of each is connected between the collectors of transistors 54 and 53, respectively, and collectors of transistors 41 and 40, respectively, of the hysteresis circuit 8. Lastly, a timing capacitor 57 is also provided across connections between the collectors of 53 and 54 and collectors of 40 and 41, respectively. Transistors 56 and 58 control the charging of capacitor 57 in a manner which will be later described. Capacitor 57 has a value selected so as to cause the voltage at the base of either transistor 56 or 58 to be greater than $V_{REF}$, thereby switching that transistor "on" and 59 "off", when one of the transistors 40 or 41 has remained saturated or "on" and the other "off" for a period longer than the maximum allowable time between data transitions.

The operation of the circuits are as follows. The write driver 4 indicates a logic state by generating slightly different voltages to create a voltage differential across the thin film head 3 and across lines A and B. The direction of the differential is switched during each write transition. The voltage differential causes more current to flow through the one of the transistors 16 and 17 having its base connected with the higher voltage level line A or B. For example, if the voltage level on line A is higher (less negative) than the voltage level on line B, more current passes through transistor 16 than passes through transistor 17. The greater current passing through resistor 10 lowers the voltage at node D in comparison with that at node C. Thus, in the level shift and integrator circuit 7, the voltage at the base of transistor 20 is higher than that at the base of transistor 21. Transistors 20 and 21 are emitter followers and provide impedance buffering from lines C, D to resistors 22,23. A voltage difference between lines C, D will be translated to the same voltage difference between lines E and F.

Referring now to the hysteresis circuit 8, if node E is higher than F, transistor 35 is passing a greater current than is transistor 36. This causes the base of transistor 44 to be higher than that of transistor 45 causing a greater current to flow through 44. A greater current passing through resistor 42 than through 43 causes the base of transistor 31 to go low relative to the base of 32, in turn causing the voltage at the collector of transistor 35 to be depressed and transistor 45 to be "off". The voltage level at node F must go enough above that at node E, subject to the previously mentioned gain, in order to make up for the voltage drop across resistor 42, before transistors 44 and 45 will switch, thereby creating a hysteresis effect. Moreover, when that state is reached, the switch in state of the transistors 44 and 45 is immediate and complete as a result of the snap action provided by transistors 31 and 32. (If node F is higher than E, then transition is controlled by resistor 43 due to symmetry.)

The timing circuit interacts with the hysteresis circuit 8 through lines G and H. Lines G and H are connected with the collectors of the pair of transistors 40 and 41 of the hysteresis circuit 8. The state of these transistors follows the states of transistors 44 and 45, respectively. In particular, the transistor 40 and 41 connected with the "on" or conducting transistor 44 or 45 will saturate and sit just below ground. Because of the low impedance presented by the collector of the saturated transistor 40 or 41, the current supplied by the timing circuit 9 will have very little effect on the voltage at the collector of that transistor. Since the remaining transistor is "off", its collector will be free of influence from the hysteresis circuit 8 and the timing circuit will be free to control the voltage at its collector (i.e. the voltage on line G or H).

In explaining how this operates, continue to assume node E is high. Transistor 44 will be on, 45 will be off, transistor 40 will saturate and 41 will also be "off", making node H free to move. (However, if transistor 41 is on, node G will behave in the same way due to symmetry.) Current is fed to the timing capacitor 57 through the transistor 54 causing the voltage in the capacitor 57 and at node H to rise slowly. As the voltage on line H goes up past $V_{REF}$, part of the current which previously passed through transistor 59 will be diverted through transistor 56. If a write transition does not occur to reverse the states of transistors 40 and 41 before capacitor 57 has elevated the base voltage of transistor 56 above $V_{REF}$, transistor 56 will switch "on" and transistor 59 "off" pulling current from node I for fault indication use. When transistor 59 switches "off", so does transistor 54. Current is drawn from the capacitor 57 by the base of the "on" transistor 56, thereby discharging the capacitor. As 57 discharges, the base voltage of 56 drops causing transistor 59 to increase current conduction again switching transistor 54 on. An equilibrium condition is reached where transistor 54 is producing just enough current into the capacitor 57 to hold the voltage steady on line H. (This "feedback" action through transistors 56 and 58 also insures that transistors 54 and 56 will not saturate.)

If there is a loss of write current or shorting of the head wire 3 during operation, the voltage at A and B will equalize. If the voltage levels at E and F merely equalize, transistors 44 and 45 and thus 40 and 41 will remain in their existing states continuing to charge the capacitor 57 thereon also causing a fault indication. Under these conditions, resistors 42 and 43 prevent the hysteresis circuit 8 from oscillating.

What I claim is:

1. An apparatus comprising:
   an electromagnetic thin film data write head;
   a write current generator connected across the head for circuiting write currents through the head and alternately varying in direction across the head to induce changes in the magnetic state of a magnetic data storage medium juxtaposed to the head, there being a maximum time period between sequential reversals of the write current direction across the head for the data encoding scheme employed by the apparatus; and
   a write fault detection circuit comprising:
   hysteresis circuit means responsive to a pair of voltage levels related in magnitude to voltage levels at either side of the write head for indicating the state of a voltage difference across the write head, the hysteresis circuit means stabilizing in one of two possible states when the pair of voltage levels across the head are of the same polarity and of a sufficiently large difference in magnitude and the hysteresis circuit means reversing state only when the relative magnitudes of the pair of voltage levels have reversed to said sufficiently large difference; and
   timing means responsive to the state of the hysteresis circuit means for generating a fault indication when the hysteresis circuit means has remained in one state for a period of time greater than said maximum time.

2. The apparatus of claim 1 wherein said hysteresis circuit means comprises:
   a first pair of npn transistors each having a base receiving one of said pair of voltage levels from the amplifier means;
   an emitter of each of the first pair of transistors being connected through a different resistor of a first pair of identical resistors to a first current sink;
   a second pair of npn transistors each having a base connected with a collector of a different one of the first pair of transistors, a collector connected with a different one of a second pair of identical resistors, and an emitter connected with a second common current sink for providing a current through the second pair of transistors and resistors;
   a third pair of npn transistors each having a base connected between the collector of a different one of the second pair of transistors and the connected resistor of the second pair of resistors, having a collector connected to a current node, and having an emitter connected with a collector of a different one of the first pair of the transistors through a different resistor of a third pair of identical resistors; and
   the first common current sink supplying a separate current through the first and third pairs of transistors and the first and third pairs of transistors whereby one of the two transistors of the second pair is rendered essentially nonconductive by small differences between the voltage levels at the bases of the first set of transistors.

3. The apparatus of claim 2 wherein the hysteresis circuit means further comprises:
   a fourth pair of identical npn transistors each having an emitter connected to a different resistor of the second pair of resistors and a base connected to ground and wherein the greater conducting transistor of the second pair causes the connected transistor of the fourth pair to saturate.

4. The apparatus of claim 3 wherein the first set of resistors are selected to render the first set of transistors linear in response to the expected range of voltage levels generated by the write driver circuit.

5. The apparatus of claim 4 wherein the timing means further comprises:
   a fault indication current source node;
   capacitance means responsive to currents passed through the fourth set of transistors of the hysteresis circuit; and
   transistor means responsive to the capacitance means for directing current from the hysteresis circuit means current node to the timing means fault indication current source node after one of the transistors of the fourth pair has remained in a saturated state for a period of time longer than said maximum time period.

6. The apparatus of claim 5 wherein said capacitor means further comprises:
   a pair of pnp transistors each having an emitter connected through a different resistor of a fifth pair of identical resistors to a common, positive voltage source node, a collector connected with a collector of a different transistor of the fourth transistor pair of hysteresis means; and
   a capacitor connected across connections between the collectors of the pair of pnp transistors and collectors of the fourth transistor pair of the hysteresis means.

7. The apparatus of claim 6 wherein said transistor means comprises:
   a pair of npn transistors each having an emitter connected in parallel to the hysteresis means current node, a collector connected in parallel to the fault indication current source node and a base connected between a different set of the connected collectors of the pair of pnp transistors and the fourth pair of transistors of the hysteresis means;
   a third npn transistor having a base connected to a reference voltage source and an emitter connected in parallel to the hysteresis means current node; and
   the capacitor and the reference voltage being selected such that when the fourth pair of transistors of the hysteresis means have each remained in their respective saturated and unsaturated states for longer than the maximum time, the voltage level across the capacitor is greater than the reference voltage whereby current is diverted from the third npn transistor through one of the fifth pair of transistors to the fault indication current source node.

8. The apparatus of claim 7 wherein said write fault detection circuit further comprises:
   capacitive means between the head and the hysteresis circuit means for removing voltage spikes induced across the head by changes in the write currents.

9. The apparatus of claim 8 wherein said write fault detection circuit further comprises:
   amplifier means connected across the head and between the head and said capacitive means for amplifying the magnitude of the voltage levels on either side of the head passed to the hysteresis circuit through the capacitive means.

10. The apparatus of claim 9 wherein the write fault detection circuit further comprises:
    a pair of npn transistors each having a base receiving a voltage signal amplified by the amplifier means from a different side of the head, a collector connected in parallel to a first voltage source and an emitter connected in series through one of an identical pair of resistors and then in parallel through one of an identical pair of capacitors and one of an identical pair of current sinks to a second voltage source more negative than said first voltage source.

* * * * *